United States Patent [19]

Erikson et al.

[11] Patent Number: 5,601,372

[45] Date of Patent: Feb. 11, 1997

[54] VIBRATION REDUCING BRUSHING

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 462,818

[22] Filed: Jun. 5, 1995

[51] Int. Cl.$^6$ .............................. F16C 33/02; F16C 27/02
[52] U.S. Cl. .............................. 384/278; 384/215
[58] Field of Search .................. 384/26, 29, 32, 384/37, 42, 129, 9, 215, 220, 222, 276, 278, 295, 297, 299, 300, 905

[56] References Cited

U.S. PATENT DOCUMENTS

| Re. 32,433 | 6/1987 | Erikson et al. | 74/441 |
|---|---|---|---|
| 2,675,283 | 4/1954 | Thomson | 384/299 |
| 3,318,642 | 5/1967 | Peterson | 384/215 |
| 4,087,137 | 5/1978 | Voitas | 384/278 |
| 4,131,031 | 12/1978 | Erikson et al. | 74/441 |
| 4,210,033 | 7/1980 | Erikson et al. | 74/424.8 A |
| 4,249,426 | 2/1981 | Erikson et al. | 74/441 |
| 4,353,264 | 10/1982 | Erikson et al. | 74/441 |
| 4,566,345 | 1/1986 | Erikson et al. | 74/89.15 |
| 4,699,573 | 10/1987 | Petrie et al. | 384/905 X |
| 4,974,464 | 12/1990 | Erikson et al. | 74/89.15 |
| 5,131,615 | 7/1992 | Hosan et al. | 384/32 X |
| 5,249,869 | 10/1993 | Mabe | 384/278 |

*Primary Examiner*—Thomas R. Hannon
*Attorney, Agent, or Firm*—Hamilton, Brook, Smith & Reynolds, P.C.

[57] ABSTRACT

A centralizing bushing associated with a shaft for reducing noise and fluctuations between the bushing and the shaft when they are moving relative to each other. The bushing is mounted in the rider and includes a bearing engagable with the shaft. There are high friction, elastomeric means engagable with the bearing for limiting movement of the bearing away from the shaft and the rider is under unbalanced radial load conditions. The coefficient of thermal expansion of the bearing is essentially the same as the coefficient of thermal expansion of the shaft. The bearing is made of a thermoplastic resin mixed with carbon fiber and having a coefficient of thermal expansion which is essentially the same as that of the shaft such that the shaft and bearing will expand and contract essentially at the same rate in response to the temperature changes.

17 Claims, 3 Drawing Sheets

VIBRATION REDUCING BRUSHING

BACKGROUND OF THE INVENTION

The invention resides in a centralizing or radially stabilizing bushing that reduces vibration and will maintain contact, alignment and general stability between a shaft and a rider, such as a nut and a threaded lead screw on which the nut translates when the screw rotates. The bushing is so constructed as to maintain these relationships while ignoring temperature changes.

It is important that riders such as a nut or hub that mounts a load, particularly one which is cantilevered, and which rider translate or run along a shaft or a rotating screw be free from radial play or motion transversely of the shaft axis. A typical mechanism is shown in our U.S. Pat. No. 4,566,345.

If, for example, the load were a laser device which aims at a target at a substantial distance from the laser, looseness of the mounting nut relative to the screw in the radial direction, of even a few ten-thousands of an inch, can result in the laser beam missing a target by feet, even though the angle of error is very small.

Conventionally, such nuts and shafts have both been made of steel or other like metals. There are a number of disadvantages of running steel-on-steel. Periodic or continuous lubrication is required, otherwise the metal will be subject to spalling, seizing up or galling. However, in many instances, lubrication must be limited, if not completely prohibited due to the environment in which the mechanism is being operated. Likewise, the product which is being made could be ruined by the lubricant.

Another problem is noise. Often, metal running on metal is noisy when there is a degree of looseness, regardless of lubrication, because of harmonic and other vibrations induced in the metal.

Attempts have been made to overcome the lubrication and noise problems by constructing the bearing of one metal and the shaft of another, the bearing usually being made of a softer metal than the shaft. This solution itself creates problems due to galvanic action and from temperature changes inducing inconsistent thermal expansion or contraction.

A circular bearing grows radially with heat with both its inside and outside diameters expanding. Conversely, cold tends to reduce both the internal and external diameters. This is true, even though both the shaft and the bearing have threads, in which instance the "bearing" would be an internally threaded nut. Consequently, a shaft of one metal or a threaded rod rotating in a circular bearing or threaded nut of another metal may either bind or become loose with temperature changes.

The amount of expansion or contraction of a metal due to heat or cold is a function of its coefficient of thermal expansion expressed in inches, per inch, per degree fahrenheit. If the bearing or nut has a higher coefficient of expansion than the shaft or screw, upon being subjected to heat, looseness resulting in play will be created between the screw and the nut resulting in noise and inaccurate operation. Conversely, if the nut and the screw, or the bearing and shaft, become colder during operation, as for example from an operation moving from indoors to outdoors, if the coefficient of expansion of the nut is greater than the screw the internal diameter decreases and the parts could seize up.

SUMMARY OF THE INVENTION

The invention is embodied in a centralizing bushing which is associated with a shaft for reducing noise and fluctuations between the bushing and the shaft when they are moving relative to each other. The bushing is mounted in a rider which may be a hub or other device for mounting a load and the shaft may be a threaded lead screw. In the latter case, the rider would be internally threaded to translate back and forth along the shaft as the shaft is rotated.

There is a bearing in the bushing which is directly engagable with the shaft. It has at least one face which extends radially of the shaft and high friction, elastomeric means are engagable with the face for limiting movement of the bearing away from the shaft when the rider is under an unbalanced radial load condition. Cap means secure the bearing within the rider or hub. The high friction, elastomeric means may be at least one elastomeric washer or could include two washers, one on each side of the bearing. In like manner, high friction, elastomeric means may be spray coated onto a surface of the bearing or a surface in the hub which may be engaged directly by the bearing.

The bearing is made of a thermoplastic resin mixed with carbon fiber and has a coefficient of thermal expansion essentially the same as that of the shaft such that the shaft or bearing will expand and contract essentially at the same rate in response to temperature changes.

The above and other features of the invention including various and novel details of construction and combination of parts will now be more particularly described with reference to the accompanying drawings and pointed out in the claims. It will be understood that the particular vibration reducing bushing embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 3:
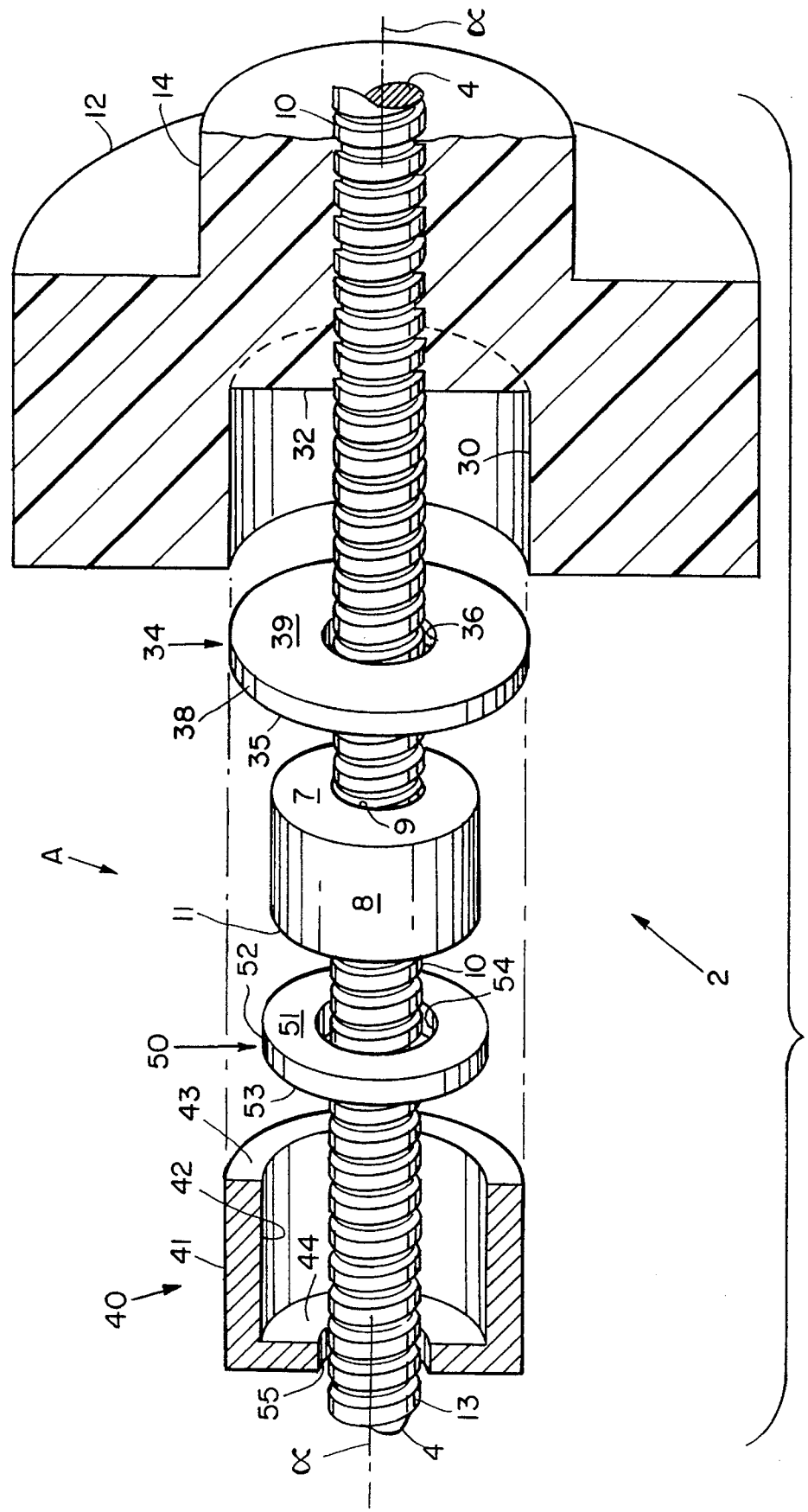
FIG. 3 is an exploded view of the bushing of FIGS. 1 and 2.

Referring first to FIG. 3, the invention is illustrated as a centralizing bushing, generally indicated A, and mounted in a rider in the form of a hub 2. The rider is internally threaded to receive a rotating lead screw 4 of the same hand and pitch. The rider 2 translates back and forth along the screw depending upon the direction of rotation of the screw 4. The rider 2 is adapted to mount a load (not shown) for reciprocation in a direction parallel to the axis α of the screw.

The bushing includes a cylindrical bearing 8 which directly engages the outer diameter 10 of the screw threads or it engages the outer diameter of a non-threaded rod, in which case, the rider 2 would not be threaded. The bearing 8 per se (i.e. the portion of the centralizing bushing which engages the screw) is made of a thermoplastic polycarbon such as a acetyl or nylon containing from about 25% to 35% carbon fibers made of graphite resulting in a coefficient of expansion of $11 \times 10^{-6}$ inches per inch per degree fahrenheit. The bearing 8 does not require lubrication, may be machined or molded and will grow and contract with the steel shaft 4 as temperature fluctuates. The rider 2 per se may be acetyl or nylon but does not have the carbon fiber additive. The shaft may be made of 303 stainless steel having a coefficient of thermal expansion of approximately $9.6 \times 10^{-6}$ inches per inch per degree fahrenheit.

The rider 2 has a first cylindrical portion 12 and a smaller, second cylindrical portion 14. The hub or rider is internally threaded to mate with the threads of the shaft 4. In the illustrative example, when the lead screw 4 is rotated, the rider 2 will translate relative to the shaft and when the shaft's rotation is reversed, the rider or hub 2 will reverse direction. It will be understood that if the shaft 4 is a non-threaded metallic rod or shaft, the hub member 2 would merely rotate or the rider would slide.

The centralizing bushing A is retained within the rider 2 in a bore 30. The bore is formed in the portion 12 and terminates in a flat circular surface 32.

A washer 34 is made out of high friction elastomeric material such as neoprene. It has a bore 36 which is slightly larger than the outer diameter 10 of the shaft or lead screw 4. It fits over the lead screw 4 and accommodates rotation without actually engaging the shaft or screw 4. The outer diameter 38 of the elastomeric washer 34 is constructed to fit into the bore 30 in the cylindrical portion 12 of the hub. A flat face 39 of the elastomeric washer 34 is engagable with the circular surface 32 of the bore 30.

A retaining cap 40 having a bore 42 which terminates in a flat, interior surface 44 is provided to hold the assemblage together in the bore 30. Surrounding the open end of the cap is a flat circular face 43. A second, high-friction elastomeric washer 50 is engagable with the interior surface 44 of the cap 40. The washer has flat faces 51 and 53, an outer diameter 52 and an inner bore 54 which is larger than the outer diameter 10 of the lead screw 4. A circular opening 55 is formed at the left-hand face of the cap 40 and is of larger diameter than the outside diameter of the lead screw 4.

Figure 1:
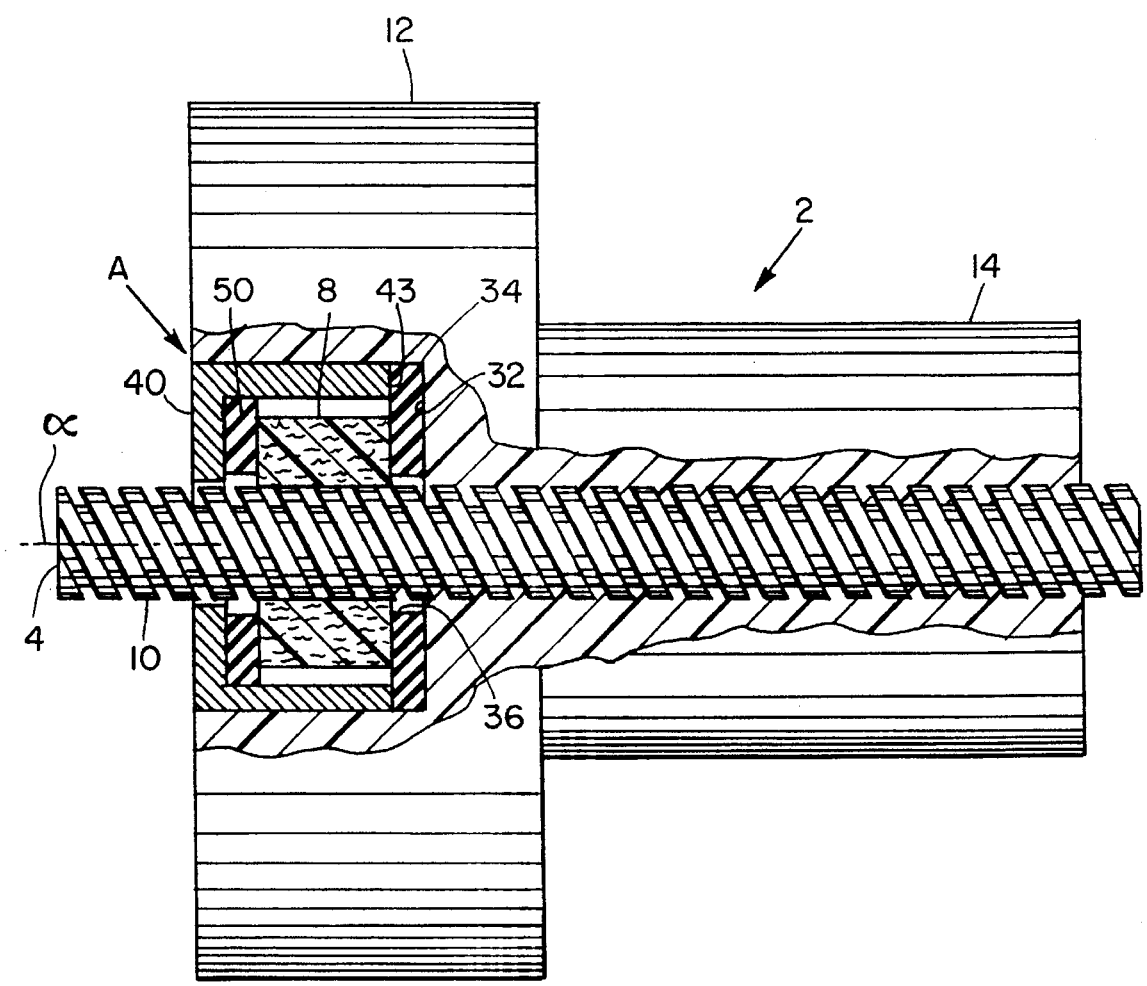
FIG. 1 is an assembly drawing of a centralizing bushing made in accordance with the invention and mounted in an internally threaded rider in the form of a hub which engages an externally threaded shaft for translation back and forth on the shaft as the shaft is rotated.

The radial stabilizing bushing A is assembled in the following manner. The elastomeric washer 34 is placed in the bore 30 in the cylindrical portion 12 of the hub 2 with its face 39 against the surface 32. The bearing 8 is assembled onto the lead screw 4 with its face 7 against the face 35 of the elastomeric washer 34. The flat face 51 of the second elastomeric washer 50 is placed in engagement with the flat face 11 of the bearing 8. The cap 40 is then pressed into the bore 30 in the rider 2. The outer diameter 41 of the cap and the inner diameter of the bore 30 are dimensioned to form a press fit. The cap 40 is urged to the right as viewed in FIG. 1 until the flat circular face 43 of the cap 40 engages the flat face 53 of the elastomeric washer 34 pressing it against the face 32 in the bore 30. The internal face 44 in the cap 40 presses the elastomeric washer 50 against the flat face 11 of the bearing 8. By this construction, the cap 40 squeezes the elastomeric washer 50 against the bearing 8, and the bearing 8 against the elastomeric washer 34, which in turn is urged against the bottom 32 of the bore 30. Because the bore 36 of the washer 34 and the bore 54 in the washer 50 are greater than the diameter 10 of the lead screw 4, only the bearing 8 engages the lead screw.

Figure 4:
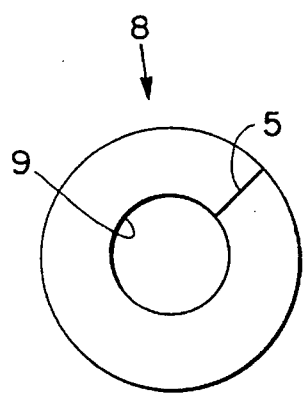
FIGS. 4 and 5 are the schematic renditions of a cylindrical bearing employed in the centralizing bushing.
Figure 5:
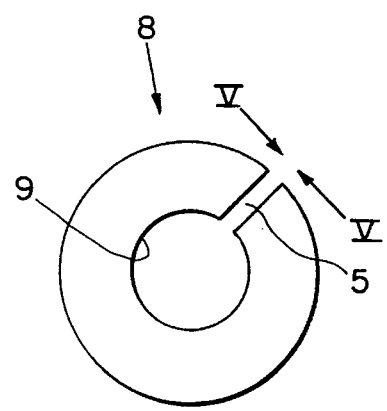

Means are provided to eliminate any tendency for the bearing 8 to cock or twist while it is being positioned in the bore 30. It is possible that, during assembly, the faces 7 and 11 of the bearing 8 will not be maintained parallel to the face 32 in the bore 30 or the face 44 in the cap. The bearing 8 may be provided with a slit at 5 as shown in FIGS. 4 and 5. The normal tendency of the slit is to stay closed. It is shown closed in FIG. 4. When the split version of the bearing 8 is placed into the bore 30, it is first opened as seen in FIG. 5 which facilitates its being assembled with ease between the washers 34 and 50 may be positioned initially on the shaft 4. However, its tendency is to close in the directions of the arrows V—V in FIG. 5. It is easier to position the split version of the bearing 8 on the screw 4 than one which is not, rendering the likelihood of cocking less likely. Since the tendency of the bearing 8 is to close the slits (to the position before slitting), it will do so until its inner diameter 9 engages the outer diameter 10 of the lead screw 4. The inner diameter 9 of the bearing 6 may be made slightly smaller than the outer diameter of the shaft to assure a snug fit.

The purpose of the elastomeric washers 34 and 50 are to assure that the bearing does not move, shift, rotate or cock under load conditions, particularly when the load is eccentric to the axis α of the shaft. Such loads are common, see our U.S. Pat. No. 4,566,345. Eccentric loading of the rider has a tendency to cock it and thus squeeze and twist the bearing 8 moving it partially out of engagement with the shaft 4 in a radial direction. However, the cap 40 presses the anti-friction washer 50 against the face of the bearing 8. The bearing, in turn, is pressed against the anti-friction washer 34 and the washer is pressed against the surface 32. The high friction washers 34 and 50 prevent shifting of the carbon filled bearing 8 preventing mechanically induced movement but at the same time permitting thermal expansion or contraction of the bearing 8 uniformly in the radial direction.

Heat is generated at the contacting surface 10 of the lead screw 4 and the inner diameter 9 of the bearing 8. Since their coefficients of expansion are essentially the same, as the lead screw 4 grows radially the inner diameter 9 of the bearing 8 grows an equal amount maintaining the elements in contact at all times thus preventing the hub 2 from wobbling relative to the lead screw 4 as, for example, when wear takes place between the threaded interior of the hub 2 and the threads of the lead screw.

As an alternative use to the high friction elastomeric washers, the faces 10 and 11 of the bearing may be coated with a high friction elastomeric material as, for example, by spraying. The surface 44 of the cap 40 and the surface 32 of the hub 22 may likewise be sprayed.

Figure 2:
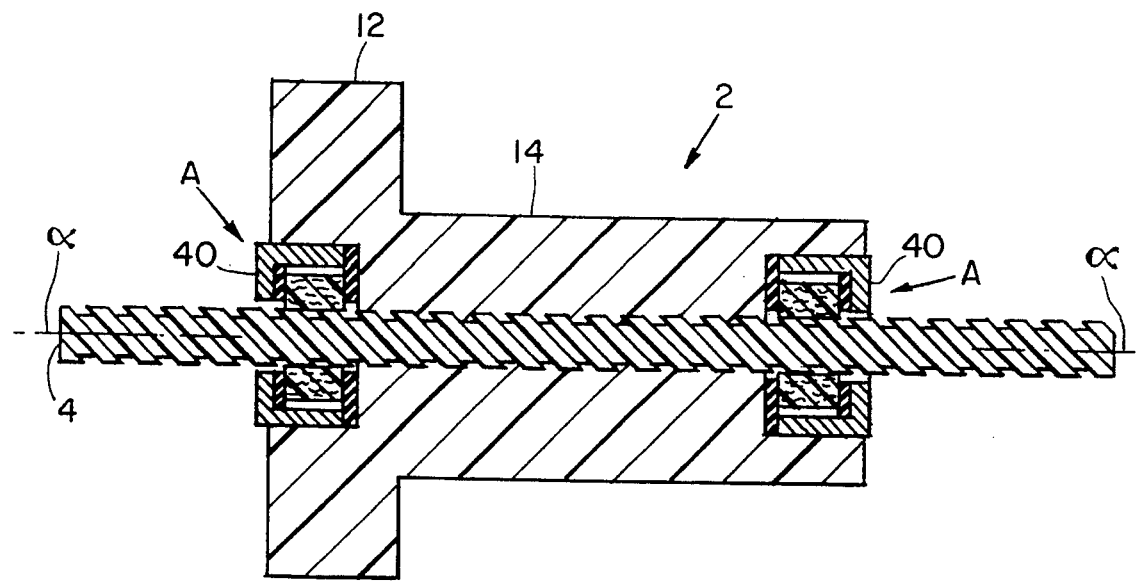
FIG. 2 shows a pair of centralizing bushings mounted in a hub for translation on a rotatable threaded shaft.

As will be seen in FIG. 2, two stabilizers A are placed in the hub member 2 to assure that wobbling does not take place at either end of the mechanism. Whereas, the cap members 40 are shown projecting slightly from the hub member 20, it does not affect its operation.

We claim:

1. A centralizing bushing associated with a shaft for reducing noise and fluctuations between the bushing and the shaft when they are moving relative to each other, comprising:

a rider mounting the bushing;

a bearing within the bushing engagable with and surrounding the shaft;

the bearing having at least one face extending radially of the shaft;

high friction, elastomeric means engagable with said face for limiting movement of the bearing away from the shaft when the rider is under unbalanced radial load conditions; and cap means securing the bearing and the elastomeric means within the rider.

2. Bushing according to claim 1 wherein the high friction, elastomeric means comprises at least one washer.

3. Bushing according to claim 1 wherein the elastomeric means comprises a pair of washers, one on each side of the bearing lengthwise of the shaft.

4. Bushing according to claim 1 wherein the coefficient of thermal expansion of the bearing is essentially the same as the coefficient of thermal expansion of the shaft such that the shaft and bearing will expand and contract essentially at the same rate in response to temperature change.

5. Bushing according to claim 1 wherein the bearing is made of thermoplastic resin mixed with carbon fiber.

6. Bushing according to claim 1 wherein the bearing is split.

7. Bushing according to claim 1 wherein the coefficient of thermal expansion of the bearing is $11 \times 10^{-6}$ inches per inch per degrees Fahrenheit and the coefficient of thermal expansion of the shaft is $9.6 \times 10^{-6}$ inches per inch per degrees Fahrenheit such that the shaft and the bearing will expand and contract at essentially the same rate in response to temperature changes.

8. A centralizing bushing for mounting a rider on a shaft to reduce noise and radial fluctuations between the rider and the shaft while they are moving relative to each other comprising:

a bushing secured in the rider and associated in the shaft;

the bushing including a bearing member engagable with the shaft and made of a thermoplastic resin mixed with carbon fiber and having a coefficient of thermal expansion essentially the same as the coefficient of thermal expansion of the shaft; and high friction, elastomeric means engagable with the bearing for limiting movement of the bearing away from the shaft when the rider is under unbalanced radial load correction.

9. Bushing according to claim 8 wherein the coefficient of thermal expansion of the bearing is $11 \times 10^{-6}$ inches per inch per degrees Fahrenheit and the coefficient of thermal expansion of the shaft is $9.6 \times 10^{-6}$ inches per inch per degrees Fahrenheit such that the shaft and the bearing will expand and contract at essentially the same rate in response to temperature changes.

10. Bushing according to claim 8 wherein the high friction elastomeric means comprises at least one washer.

11. Bushing according to claim 8 wherein the elastomeric means comprises a pair of washers, one on each side of the bearing lengthwise of the shaft.

12. Bushing according to claim 8 wherein the bearing is split.

13. A centralizing bushing for mounting a rider on a shaft to reduce noise and radial fluctuations between the rider and the shaft while they are moving relative to each other comprising:

a bushing secured in the rider and associated with the shaft;

the bushing including a bearing member engagable with the shaft and made of a thermoplastic resin mixed with carbon fiber and having a coefficient of thermal expansion essentially the same as the coefficient of thermal expansion of the shaft; and high friction elastomeric means engagable with the bearing member for limiting movement of the bearing away from the shaft.

14. Bushing according to claim 13 wherein the high friction elastomeric means comprises at least one washer.

15. Bushing according to claim 13 wherein the high friction elastomeric means comprises a pair of washers, one on each side of the bearing lengthwise of the shaft.

16. Bushing according to claim 13 wherein the coefficient of thermal expansion of the bearing is $11 \times 10^{-6}$ inches per inch per degrees Fahrenheit and the coefficient of thermal expansion of the shaft is $9.6 \times 10^{-6}$ inches per inch per degrees Fahrenheit such that the shaft and the bearing will expand and contract at essentially the same rate in response to temperature changes.

17. Bushing according to claim 13 wherein the bearing is split.

* * * * *